United States Patent [19]
Rosler

[11] Patent Number: 5,979,649
[45] Date of Patent: Nov. 9, 1999

[54] ELONGATED PACKING CONTAINER FOR AN ELONGATED OBJECT

[75] Inventor: Peter Rosler, Jfenweg, Germany

[73] Assignee: Rose Plastic GmbH, Hergensweiler, Germany

[21] Appl. No.: 09/032,715

[22] Filed: Feb. 27, 1998

[30] Foreign Application Priority Data

Feb. 28, 1997 [DE] Germany ............... 297 03 674 U
Feb. 16, 1998 [DE] Germany ............... 198 06 217

[51] Int. Cl.$^6$ ............... B65D 85/28
[52] U.S. Cl. ............... 206/379; 206/349
[58] Field of Search ............... 206/305, 306, 206/349, 379; 220/735

[56] References Cited

U.S. PATENT DOCUMENTS

| | | |
|---|---|---|
| 2,503,171 | 4/1950 | Posner . |
| 3,280,969 | 10/1966 | Evans et al. . |
| 3,338,390 | 8/1967 | Gordon . |
| 3,803,915 | 4/1974 | Chaney ............... 206/306 |
| 4,061,226 | 12/1977 | Essen ............... 206/306 |
| 4,402,401 | 9/1983 | Leno ............... 206/349 |
| 4,509,656 | 4/1985 | Rosler . |
| 4,542,825 | 9/1985 | Thomas et al. ............... 206/349 |
| 4,619,364 | 10/1986 | Czopor . |
| 4,850,490 | 7/1989 | Reynolds . |
| 4,995,513 | 2/1991 | Rosler . |
| 5,119,936 | 6/1992 | Sevey ............... 206/349 |
| 5,213,207 | 5/1993 | Konev ............... 206/349 |
| 5,456,887 | 10/1995 | Calvo et al. ............... 206/305 |
| 5,562,212 | 10/1996 | Rosler . |
| 5,577,629 | 11/1996 | Rosler . |
| 5,588,525 | 12/1996 | Rosler . |
| 5,680,949 | 10/1997 | Roesler . |
| 5,706,941 | 1/1998 | Erisoty ............... 206/349 |

FOREIGN PATENT DOCUMENTS

| | | |
|---|---|---|
| 00 98 216 | 1/1994 | European Pat. Off. . |
| 10 24 588 | 4/1953 | France . |
| 20 44 907 | 2/1971 | France . |
| 5 10 788 | 3/1929 | Germany . |
| 19 47 369 | 10/1966 | Germany . |
| 16 11 962 | 1/1968 | Germany . |
| 92 01 440 U1 | 6/1968 | Germany . |
| 72 23 529 | 6/1972 | Germany . |
| 17 86 561 A1 | 1/1973 | Germany . |
| 76 02 765 | 2/1976 | Germany . |
| 30 30 208 A1 | 3/1982 | Germany . |
| 90 01 051 U1 | 5/1990 | Germany . |
| 92 02 429 U1 | 8/1992 | Germany . |
| 29 50 208 U1 | 8/1996 | Germany . |
| 295 04 208 U1 | 8/1996 | Germany . |
| 19 94 367 | 6/1997 | Germany . |
| 297 03 674 U1 | 6/1997 | Germany . |
| 94 03 495 U1 | 6/1997 | Germany . |

*Primary Examiner*—David T. Fidei
*Attorney, Agent, or Firm*—Frederick L. Tolhurst

[57] ABSTRACT

An elongated packing container is intended to receive tools and other objects. In order to avoid damage to these objects upon dropping and falling of the container on the ground, a cushioning arrangement is arranged at the point of the container. The cushioning arrangement lends some play in terms of elastic movement to the side walls opening out in the point of the container, when the object in the container with its mass acceleration causes force to impact on the side walls of the container. This arrangement avoids the object's penetrating the point of the container and becoming damaged.

13 Claims, 2 Drawing Sheets

ELONGATED PACKING CONTAINER FOR AN ELONGATED OBJECT

BACKGROUND OF THE INVENTION

1. Field of the Invention

The invention relates to an elongated packing container to hold an elongated object according to the disclosure in the main claim.

2. Description of the Prior Art

Such packing containers are known and are manufactured for example as a cylindrical sheathing of synthetic resin or as a type of shallow pocket likewise of synthetic resin (usually of two different materials). These packing containers serve for instance for holding manufacturing tools, such as drill bits, milling cutters or tools and so forth, wherein these tools can be held in the container with a relatively considerable amount of play—in other words with rather extensive freedom of movement. Insofar as the packing has to do with sturdy tools, no problems generally occur. On the other hand, if the packing is for those tools which are sensitive to potential damage on their work surfaces or inserts or attachments, on this account the packing is often quite costly.

From this point of view it is also to be considered that such tools are offered for purchase as very costly items in hobby or construction markets, whereby the danger exists that the purchasers or service people are not always careful with the goods and on this account the items sometimes fall from different heights to the ground and can thus be damaged, which then leads to expensive losses for the party offering the goods.

The object of the invention is to further develop a packing container of this known type, so that the aforementioned drawbacks of known packing containers, especially carrying items such as objects which are sensitive to damage, are avoided, in other words, a packing container is to be disclosed in which the relevant object is held securely and also is centered and the packing is of such a shape that it offers protection even when the container falls, including protection of the object held therein, essentially by means of the frontal or working surface of the closed container at the front of the fall but not necessarily only in this case.

SUMMARY OF THE INVENTION

The cited problem is solved according to the invention with a packing container of the aforementioned type with the features disclosed in the disclosure part of claim 1.

Advantageous further embodiments and constructions of the packing container are the objects of claims 2 to 10.

It is an important feature of the invention that a cushioning arrangement is arranged in the point of the container, which arrangement gives the side walls forming the point of the container some elastic, outwardly directed play of movement, when the container falls to the ground with the point at the front and with the object held therein. Because of the elastic movement in the play of the front or working side walls an important portion of the mass acceleration of the object is transferred not directly onto the side walls, but instead this mass acceleration force is first received and absorbed by the elastically shunting, working side walls. This arrangement prevents the mass acceleration force being transferred directly from the object to the working side walls from working directly and immediately on the side walls. To be sure, if this cushioning arrangement is not there, then the danger exists that the side walls—on account of the lack of play and lack of elastic movement—are impacted and penetrated directly by the object, which then is damaged with its point pressing out from the container.

With special structural shaping of the closed end of the container into an exterior and interior point, the end of the tool with its working portion is centered in the interior point, so that in cooperation with the member closing off the open end of the container it is held relatively incapable of movement and thus protected in the container. On the other hand, in case of a fall of the container with the point in the front, the rib present on the exterior surface of the container point causes the described springing or cushioning effect, so that all in all greater protection is attained against damage of the object being carried.

This protection can be still further enhanced if, as in claim 2, in the procedure of establishing the length and elongation of the container—in other words at least one constriction being constructed at some spacing from each of the two container ends, which frees an opening concentric to the container axis, which during production can be adapted substantially to the external dimensions of the object later to be held therein. The object to be protected is thus approximately in the middle of the container and centered along its longitudinal axis and has no undue play in terms of side movement in the container.

The number of constricted areas is of course dependent upon the length of the object to be held and thus is selected according to the container.

Two different constructions come into consideration for the exterior configuration of the packing container, including one cylindrical construction and one flattened out or shallow construction. Other constructions, for instance oval or multisided, are also included in the invention.

The container with circular cross section, in which the rib runs diametrically to the container point, is of greatest use for receiving tools having large diameters (exterior diameter), whereby on the peripheral surface the container also offers sufficient space for a label or some other indication.

The container with flattened cross section, in other words with two parallel and flat surfaces at some spacing from one another as well as preferably curved surfaces connected with and connecting these surfaces, in which the rib runs parallel to the side surfaces in the plane including the container longitudinal axis, is intended mainly to receive objects with smaller diameters (exterior diameter). This flattened configuration offers sufficient space for a label or some other indication (relating to the contents, the manufacturer or the like) on one or both of the side surfaces, whereby this construction still offers the advantage of a certain saving of space as compared with the circular configuration for the same contents when for instance the containers are arranged in suspension one behind the other, without providing the advantage of the centering, security and protection in the receiving and holding of the object.

The rib, of which the exterior borders preferably run parallel to the exterior surfaces forming the point of the container, is to have a width which corresponds to at least double the wall thickness of the container peripheral wall, and preferably the rib is flattened outward to both sides at its apex from the penetration point of the container longitudinal axis. As research has established, such a configuration of the rib has provided the best springing or cushioning effect, if the container with contents were to be let fall with the point at the front of the fall.

The open end of the container is preferably closed off by a plug-like closing off member, engaging into this container and with certain axial extension being inserted therein, which member incorporates a suspension tab or a gripping member. The preferred configuration for this purpose can be assumed to be an oblique encircling surface preferably leading out from the open container border, directed inwards, which changes over into an essentially horizontal shoulder surface in the peripheral wall of the container. The plug-like closing off member then preferably includes a cylindrical or flattened oval collar, adapted to the shape of the container opening, on which is constructed a small, surrounding rib, which in closed setting catches resting behind the annular shoulder, which however facilitates release of the plug by a traction force being applied thereon. On the other hand fingers could be constructed on the plug, which catch into a collar-like construction and come to rest behind the annular shoulder.

The container, for which the manufacturing method can be especially simple, is advantageously manufactured of a transparent synthetic resin, manufactured by means of the blow-molding method, since in this manner the desired container constriction is to be produced most favorably with undercutting or back tapering and formation of constricted areas.

BRIEF DESCRIPTION OF THE DRAWINGS

The object of the invention is explained in greater detail with reference to the attached drawing relating to preferred exemplary embodiments.

They show.

DESCRIPTION OF THE PREFERRED EMBODIMENT

Figure 1:
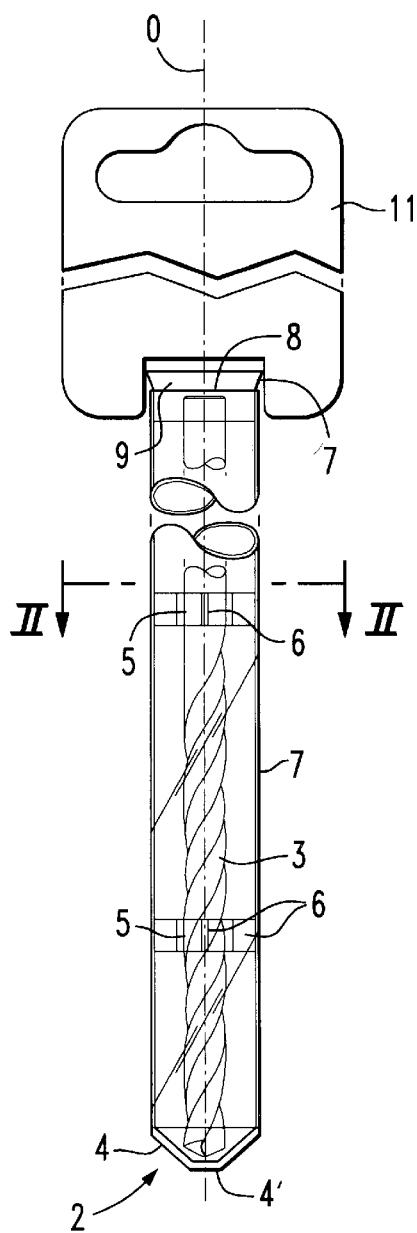
FIG. 1: a view of a cylindrical packing container in closed state with a spiral drill bit carried therein.
Figure 2:
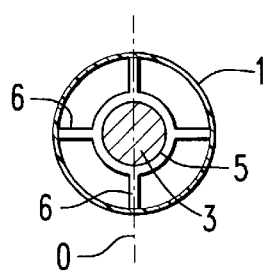
FIG. 2: the cross section along line II—II of FIG. 1.

FIGS. 1 and 2 show a cylindrical packing container 1 with a peripheral wall surrounding a hollow chamber and with a bottom, closed end which is formed by surfaces extending out from the peripheral wall, which converge in a point 2 and define an interior chamber receiving the essentially conical end of an object 3. A rib 4 is constructed on the exterior surface producing point 2, rib 4 in a plane including the longitudinal axis 0 of container 1 (cf. also FIG. 6).

Figure 3:
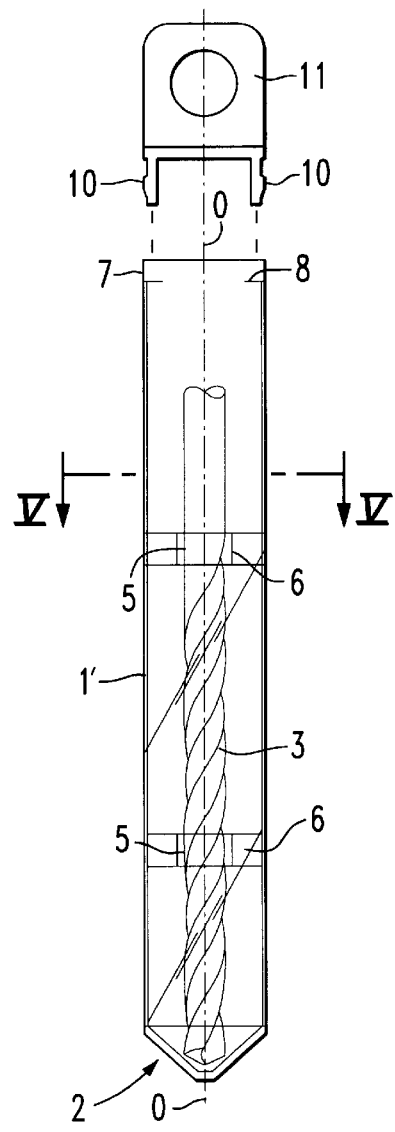
FIG. 3: a frontal view of a flattened packing container in opened state with a spiral drill bit therein.
Figure 5:
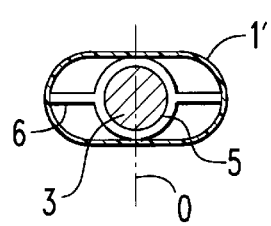
FIG. 5: the cross section along line V—V of FIG. 3.

FIGS. 3 and 5 show a packing container 1' in flattened configuration, in other words, this container 1' includes two side surfaces being parallel to one another, which face one another at some spacing, and two outwardly curved surfaces connecting these side surfaces, whereupon the hollow chamber is enclosed for receiving object 3. Also in this case point 2 is formed of converging surfaces on which is constructed a rib 4, and the converging surfaces define an interior hollow chamber, tapering relative to the longitudinal axis 0 of container 1' and receiving the free end of object (tool) 3, which for example includes a bit which is sensitive to damage.

Both packing containers 1 and 1', between the top open and the bottom closed ends (point 2), made up of the peripheral wall of the container, have at least one circular constricted area 5 (of which two different configurations 5 are shown in the drawing), which frees an interior opening, which is penetrated by object 3 with only very slight play. The constricted areas also include fillets 6, which are lengthened by squashing together the peripheral wall at these points.

In container 1 with cylindrical cross section exterior rib 4 runs diametrically to the closed container end.

In flattened container 1', rib 4 runs parallel to both larger, flat side surfaces.

Figure 4:
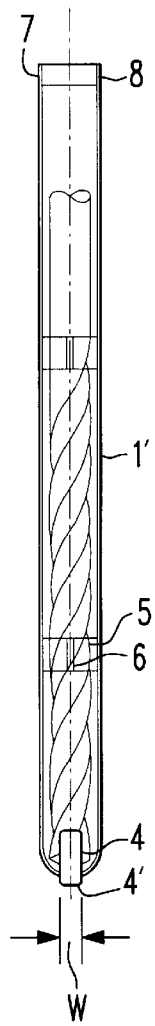
FIG. 4: a side view of the packing container of FIG. 3.
Figure 6A:
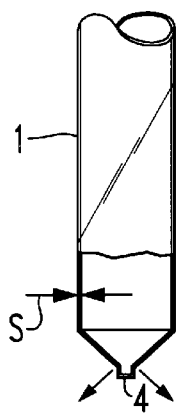
FIG. 6: detailed views in different representations (a), (b) and (c) of the bottom end of a cylindrical packing container.

Rib 4 has a width W (cf. FIG. 4) which is at least identical to double the wall thickness S (cf. FIG. 6(a)) of container 1 or 1'. The free exterior borders of rib 4 run preferably parallel to the surfaces forming point 2, as is shown in FIGS. 1, 3 and 6(c), so that rib 4 projects out from these surfaces to the same measure whatever the configuration.

At its apex, rib 4 has a small, flattened surface 4', aligned at a right angle to container longitudinal axis 0. As shown in FIG. 6(a) by arrows, as a result of the conical point 2 and the special configuration of rib 4, a force working on container 1, 1' in case of a fall with point 2 at the front of the falling object, a force effecting it can be shunted to the side and downward, so that as a result and in connection with the centering of object 3 in the container produced by at least one constriction area 5, the parts of the falling object (tool) are protected from damage.

The open (top) end of the container has an oblique surface 7 leading out from the container border, then directed inwards, becoming an essentially horizontal shoulder surface 8. This configuration serves to tightly hold closing off plug 9, which either with the help of a surrounding annular shoulder or by means of fingers 10 (c. FIG. 3), which have fastening catch attachments, is/are hooked in to rest behind shoulder surface 8.

On plug 9 is mounted a gripper member or a suspension tab 11, so that closing off plug 9 can be released from its contact and resting point by traction. Preferably plug 9 is of such dimensions in axial alignment that it exerts a slight pressure on one end of object 3, as shown in FIG. 1, in order also to securely set this object in longitudinal direction in container 1, 1'.

Figure 6B:
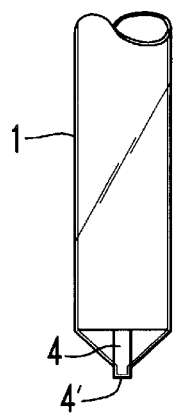
Figure 6C:
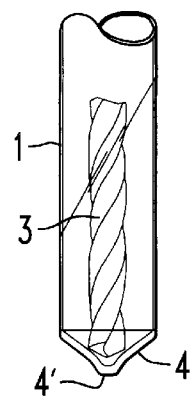
Figure 7:
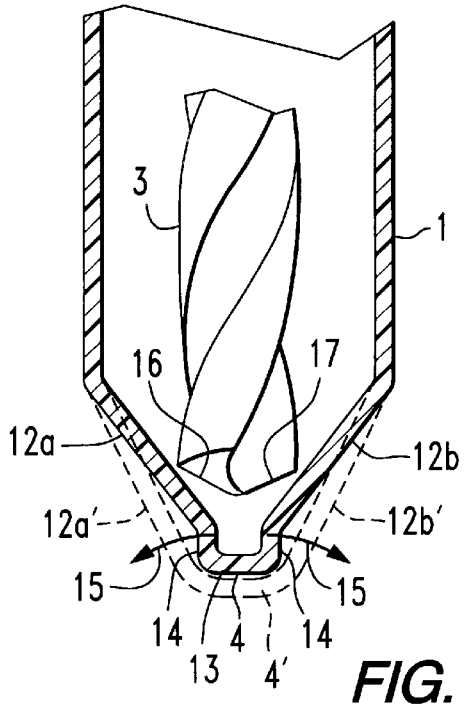
FIG. 7: an enlarged representation of FIG. 6 with representation of the method of operation of the cushioning arrangement.

FIG. 7 shows the manifestation of the rib 4 shown in FIG. 6 forming the cushioning arrangement. The side walls 12a and 12b defining point 2 of container 1 open in their front area adjacent to the point in the rib 4 projecting out of the plane of the side walls, the rib connecting the two side walls 12a, 12b with one another. The rib consists of an approximately rectangularly profiled body with a frontal bottom wall 13, which on both sides is connected to side walls 14, which are integrally connected to side walls 12a, 12b with the assembly formed of one single piece of material.

The object 3 to be protected is located for example with its side surfaces 16, 17 on side surfaces 12a, 12b of the container. If container 1 falls to the ground in the direction of arrow 20, then the mass acceleration forces of the object take effect through its surfaces 16, 17 on side surfaces 12a, 12b of the container. Thus the side surfaces are elastically outwardly deformed in the direction of arrow 15 and get into the settings of 12a' and 12b' shown in FIG. 7. This is the result, because rib 4 widens out elastically (into arrangements 4'), and the connection is formed between side walls 12a, 12b.

The mass acceleration force of the object will therefore pass over onto the working, elastically widening out side walls 12a, 12b and is absorbed by these walls. This force is transferred directly to only a small portion of the side walls, which walls are protected against penetration by the object.

Figure 8:
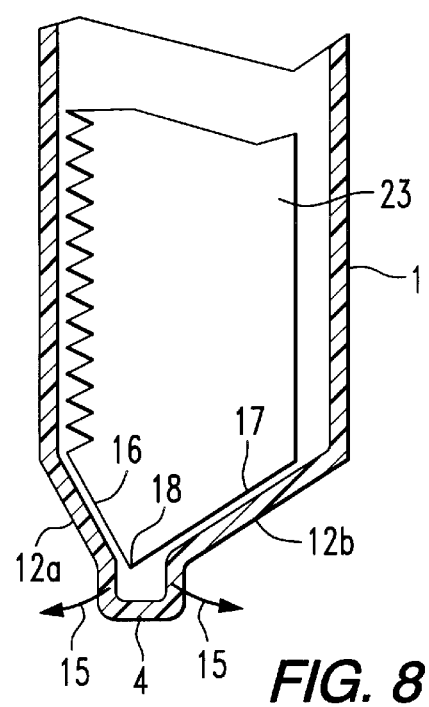
FIG. 8: a modification of the embodiment shown in FIG. 7 with the point of the container not in the middle.

FIG. 8 shows that the cushioning arrangement need not necessarily lie in container longitudinal axis 0. If for example a saw blade 23 is to be stored protectively in container 1, then point 18 of the saw blade lies at some distance from the middle and likewise a contact which is not located in the middle occurs between surfaces 16, 17 and associated side walls 12a, 12b of the container.

Figure 9:
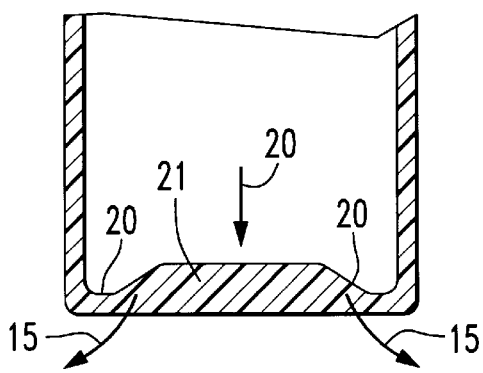
FIG. 9: a second embodiment of a cushioning arrangement.
Figure 10:
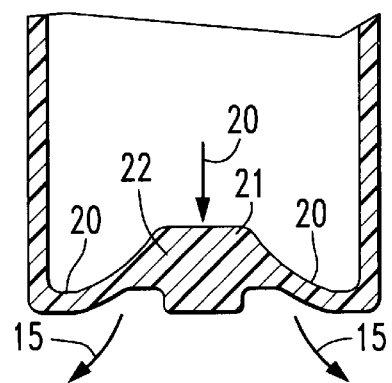
FIG. 10: a third embodiment of a cushioning arrangement.

FIGS. 9 and 10 show that the cushioning arrangement need not necessarily consist of a rib 4. In this embodiment the cushioning arrangement consists of a base wall 21 of reinforced thickness, connected through the constricted areas 20 of the container walls (or container front wall) to the sides, allowing some play in terms of elastic movement in relation to the other container walls. Here too a considerable portion of the movement energy of the object is absorbed by the elastic, outwardly directed deformation of reinforced base wall 21.

In addition, FIG. 10 also shows that one or more bottom ribs 22 can be arranged in the area of base wall 21. The ribs can be aligned to the exterior, as shown in FIG. 10. However they can also be aligned inwardly, projecting into the interior of the container, still on base wall 21.

Of course it also lies within the technical capacity of the person skilled in the art to mount the working surfaces (surfaces 16, 17) in the container, where object 3 is mounted inside on container side walls 12a, 12b, and correspondingly to profile the object or to provide it with projections, in order to center and also to hold the object in this area.

I claim:

1. An elongated packing container for receiving a pointed, elongated object, said container comprising:

a peripheral wall that defines an internal chamber, said internal chamber having one closed end that is formed by converging walls that intersect at a point, said internal chamber also having one open end that is located oppositely from said closed end, such that when the elongated object is received in the internal chamber of said container, said object cooperates with said container to define a gap between the elongated object and the surface of the internal chamber of said container;

a plugging member for sealing the open end of said internal chamber; and at least one rib that is connected to the external surfaces of the converging walls of the container, said rib providing the converging walls with outwardly directed flexibility.

2. The packing container of claim 1, further comprising at least one constricted member that is connected to the peripheral wall, said constricted member being located within said internal chamber and longitudinally spaced apart from the closed end and from the open end of said internal chamber, said constricted member defining an opening for receiving said elongated object.

3. The packing container of claim 1 wherein the cross section of the peripheral wall of the container is circular and wherein the rib is oriented diametrically with respect to the longitudinal axis of the container.

4. The packing container of claim 1, wherein portions of the peripheral wall of the container are located in two parallel planes that are spaced apart from one another and wherein the peripheral wall of the container also includes two curved wall portions that connect the wall portions in said parallel planes, whereby the rib is located between the two spaced apart parallel planes.

5. The packing container of claim 1, 2, 3 or 4 wherein the width of the rib is at least twice the thickness of the peripheral wall of the container.

6. The packing container of claim 1, 2, 3 or 4 wherein the rib has free exterior borders that are oriented parallel to the converging walls that form the point of the closed end of the internal chamber.

7. The packing container of claim 1, 2, 3 or 4 wherein the rib has an apex that has a flattened surface.

8. The packing container of claim 1, 2, 3 or 4 wherein the peripheral wall of the container has a horizontal shoulder surface formed therein and wherein the peripheral wall of the container has an inwardly aligned oblique surface between open end of the container and the horizontal shoulder surface and also wherein said plugging member includes a shoulder such that the shoulder of the plugging member engages the peripheral wall of the container.

9. The packing container of claim 1, 2, 3 or 4 wherein the container is comprised of transparent synthetic resin that is shaped through a blow-molding process.

10. An elongated packing container for receiving a pointed, elongated object, said container comprising:

a peripheral wall;

a base wall having side constricted areas that connect the base wall to the peripheral wall of the container, said base wall cooperating with said peripheral wall to define an internal chamber having one closed end that is formed by the base wall, said internal chamber also having one open end that is located oppositely from said closed end, such that when the elongated object is received in the internal chamber, said object cooperates with said container to define a gap between the elongated object and the surface of the internal chamber, the constricted areas of said base wall allowing elastic movement of said base wall with respect to said peripheral wall; and a plugging member for sealing the open end of said internal chamber.

11. The packing container of claim 10 wherein the cross section of the container is circular.

12. The packing container of claim 10 or 11 wherein the peripheral wall of the container has a horizontal shoulder surface formed therein and wherein the peripheral wall of the container has an inwardly aligned oblique surface between the open end of the container and the horizontal shoulder surface and also wherein said plugging member includes a shoulder such that the shoulder of the plugging member engages the peripheral wall of the container.

13. The packing container of claim 12 wherein the container is comprised of transparent synthetic resin that is shaped through a blow-molding process.

\* \* \* \* \*